No. 741,196. PATENTED OCT. 13, 1903.
J. W. VOGAN.
COFFEE POT.
APPLICATION FILED SEPT. 20, 1902.
NO MODEL.
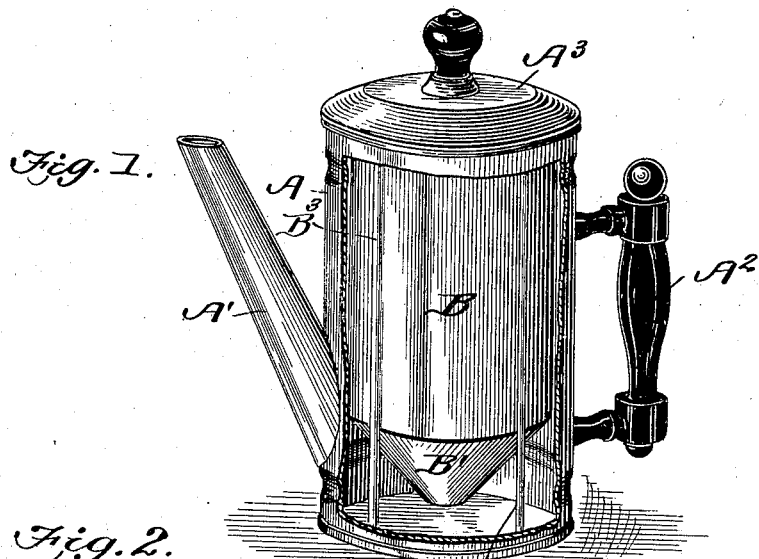
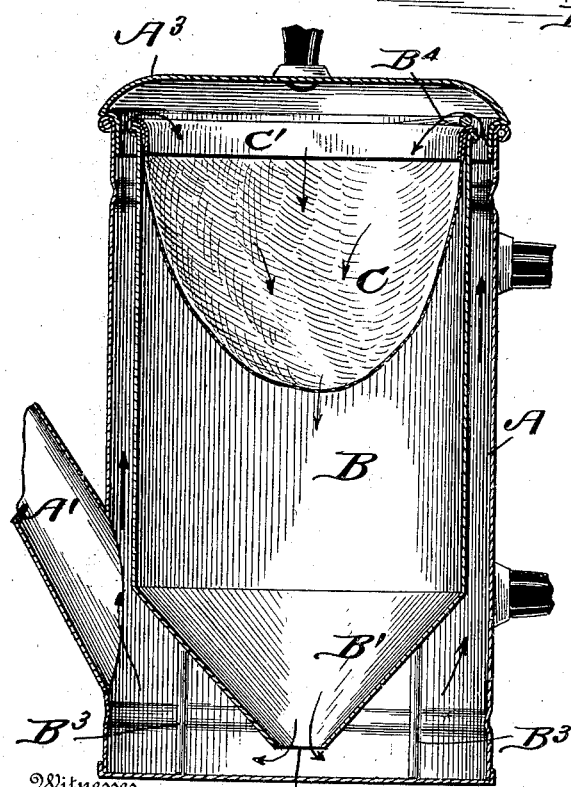
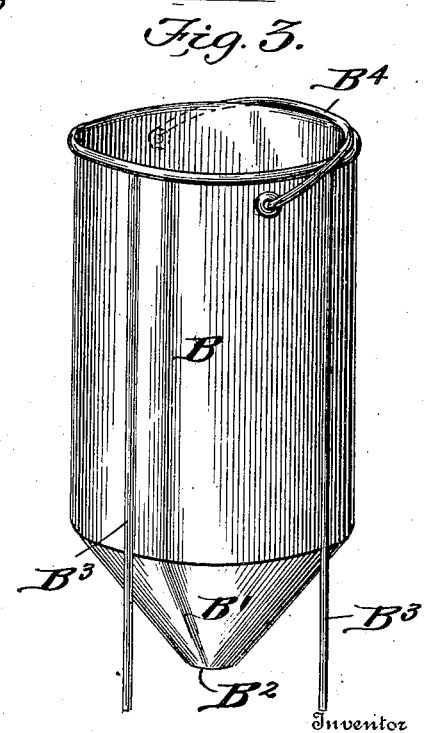
Inventor
James W. Vogan, No. 741,196.                                              Patented October 13, 1903.

UNITED STATES PATENT OFFICE.

JAMES WILLIS VOGAN, OF CHICAGO, ILLINOIS.

COFFEE-POT.

SPECIFICATION forming part of Letters Patent No. 741,196, dated October 13, 1903.

Application filed September 20, 1902. Serial No. 124,242. (No model.)

*To all whom it may concern:*

Be it known that I, JAMES WILLIS VOGAN, a citizen of the United States, residing at Chicago, in the county of Cook and State of Illinois, have invented a new and useful Improvement in Coffee-Pots, of which the following is a specification.

This invention relates generally to coffee-pots, and more particularly to that class thereof known as "drip" coffee-pots, in which the coffee is supported in a suitable bag or receptacle and boiling water passed therethrough.

The object of the present invention is to provide an improved means for holding the bag or receptacle, such holding means being of such construction that the water as it boils will be forced upwardly and over the edges of the said receptacle down through the coffee.

Another object is to provide a holder which shall be easily removable, so that the coffee-grounds can be removed from the pot as soon as the coffee is made, thereby preventing the coffee becoming too strong or receiving the bitter taste which is the result of permitting the coffee-grounds to remain in the coffee after the making operation has been completed.

The invention consists in the novel features of construction, combination, and arrangement, all of which will be fully described hereinafter and pointed out in the claims.

In the drawings, forming a part of this specification, Figure 1 is a perspective view, partly in section, and illustrating a coffee-pot constructed in accordance with my invention. Fig. 2 is a vertical sectional view. Fig. 3 is a perspective view illustrating the bag-holder, together with means for supporting said holder.

Referring to the drawings, A indicates an ordinary construction of coffee-pot, having spout $A'$, handle $A^2$, and top $A^3$. An essentially cylindrical bag-holder B is arranged within the pot, said holder being somewhat smaller in diameter than the said pot, and thereby providing an annular space between the said holder and the interior of the coffee-pot. The lower end of this holder B is funnel-shaped, as indicated at $B'$, and at the bottom of said funnel-shaped portion is a small opening $B^2$. This cylindrical holder is supported upon legs $B^3$, preferably three in number, and these legs may be connected to the cylinder in any suitable manner and each of such length that when they rest upon the bottom of the coffee-pot the lower end of the funnel $B'$ will be supported a short distance above the said bottom of the coffee-pot. A bail or handle $B^4$ is pivotally connected to the upper end of the holder and is intended to be used when handling the said holder. The bag or receptacle C is constructed of any desirable material, its edges being turned over the upper edge of the holder, and a ring $C'$ is forced into the top of the holder and binds the bag or receptacle thereto. The ground coffee is placed in this bag or receptacle, and the proper quantity of water is placed in the coffee-pot. The coffee-pot is then placed upon the stove and the water boiled, and as the water boils it passes upwardly through the annular space over the top of the holder and down into the bag or receptacle and through the coffee. After passing through the coffee the boiling water passes down out through the contracted end of the holder and up around through the annular space again, this circulation being continued so long as the holder remains within the pot. As soon as the coffee has been subjected to the action of the boiling water for a sufficient length of time the holder is removed, the bail or handle $B^4$ being employed to lift the holder, with its contents, clear of the coffee-pot. The coffee can thus be kept warm for an indefinite period of time without becoming strong or bitter, as would be the case if the bag or receptacle with the coffee-grounds were permitted to remain in the coffee-pot. The contracted lower end of the cylindrical holder aids materially in causing the circulation of the boiling water.

It will thus be seen that I provide an exceedingly cheap, simple, and efficient construction of coffee-pot, by means of which an excellent quality of coffee can be made and which will avoid the disagreeable bitter taste often prevalent in drip-coffee.

Having thus fully described my invention, what I claim as new, and desire to secure by Letters Patent of the United States, is—

1. The combination with a coffee-pot, of a cylindrical vessel having an inverted, centrally-perforated, conical bottom, said vessel being adapted to fit within the pot, a flange surrounding the upper edge of said vessel, depending legs secured to the exterior of said vessel, and extending from said flange to a point below the conical bottom, and a bag arranged within the upper part of said vessel.

2. The combination with a coffee-pot, of a vessel adapted to rest within the coffee-pot said vessel having a contracted, downwardly-open neck at its lower end, a flange around the upper end of the vessel, legs extending below the vessel and secured to same above the contracted neck, a bag depending within the upper part of the vessel and overlapping said flange, and a flanged ring adapted to fit within said vessel over the bag, the flange of said ring fitting over the flange of the vessel.

3. The combination with a coffee-pot of the cylindrical bag-holder arranged therein, said holder being of less diameter than the coffee-pot, the lower end of said cylinder being essentially funnel-shaped and having a single opening at the bottom, the supporting-legs attached to the holder and adapted to support the lower end a short distance above the bottom of the coffee-pot, the coffee-holding bag, the clamping-ring and bail or handle, all arranged and adapted to operate, substantially as shown and described.

JAMES WILLIS VOGAN.

Witnesses:
FRED DE CAMP,
TOS. A. MARTH.